United States Patent
Truong et al.

(10) Patent No.: US 11,425,336 B2
(45) Date of Patent: *Aug. 23, 2022

(54) SYSTEMS AND METHODS FOR DYNAMICALLY CONCEALING SENSITIVE INFORMATION

(71) Applicant: Capital One Services, LLC, McLean, VA (US)

(72) Inventors: Anh Truong, Champaign, IL (US); Reza Farivar, Champaign, IL (US); Jeremy Edward Goodsitt, Champaign, IL (US); Kate Key, Effingham, IL (US); Vincent Pham, Champaign, IL (US); Galen Rafferty, Mahomet, IL (US); Austin Walters, Savoy, IL (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/228,563

(22) Filed: Apr. 12, 2021

(65) Prior Publication Data

US 2022/0060661 A1     Feb. 24, 2022

Related U.S. Application Data

(63) Continuation of application No. 16/998,610, filed on Aug. 20, 2020, now Pat. No. 11,006,077.

(51) Int. Cl.
*H04N 7/15*     (2006.01)
*H04L 9/40*     (2022.01)

(52) U.S. Cl.
CPC ........... *H04N 7/152* (2013.01); *H04L 63/168* (2013.01); *H04L 2209/16* (2013.01)

(58) Field of Classification Search
CPC .......... H04N 7/15; H04N 7/152; H04N 7/147; H04L 2209/16; H04L 65/403
(Continued)

(56) References Cited

U.S. PATENT DOCUMENTS 8,717,408 B2    5/2014   Khot et al.
2011/0179366 A1  7/2011  Chae
(Continued)

FOREIGN PATENT DOCUMENTS

WO     2015172521 A1    11/2015

*Primary Examiner* — Melur Ramakrishnaiah
(74) *Attorney, Agent, or Firm* — Troutman Pepper Hamilton Sanders LLP; Christopher J. Forstner; John A. Morrissett

(57) ABSTRACT

Systems and methods for dynamically concealing sensitive information in a shared screen session of a video conference are disclosed. The system may establish communication with one or more computing devices active in a video conference in which each computing device may switch between a screen share mode and a video mode. The system may determine that one or more articles of sensitive information are visible in a graphical user interface associated with a first computing device of the plurality of computing devices. The system may receive a first signal from the first computing device that indicates a first intent of a host associated with the first computing device to switch the screen share mode which includes sharing the first graphical user interface with the one or more computing devices during the video conference. In response to the first signal, the system may execute one or more privacy actions.

20 Claims, 8 Drawing Sheets

(58) Field of Classification Search
USPC .......................................... 348/14.01–14.16
See application file for complete search history.

(56) References Cited

U.S. PATENT DOCUMENTS

| | | | | |
|---|---|---|---|---|
| 2011/0271211 | A1* | 11/2011 | Jones | H04M 3/567 |
| | | | | 715/753 |
| 2014/0215356 | A1* | 7/2014 | Brander | G06F 3/14 |
| | | | | 715/753 |
| 2015/0278534 | A1* | 10/2015 | Thiyagarajan | G06F 21/84 |
| | | | | 726/28 |
| 2018/0096113 | A1 | 4/2018 | Hassan et al. | |
| 2018/0121663 | A1 | 5/2018 | Hassan et al. | |
| 2019/0166330 | A1 | 5/2019 | Ma et al. | |
| 2020/0026485 | A1* | 1/2020 | Deenadayal | G06F 3/1454 |
| 2020/0133441 | A1* | 4/2020 | Smith | G06F 3/0481 |
| 2020/0159961 | A1 | 5/2020 | Smith et al. | |
| 2021/0211446 | A1* | 7/2021 | Albero | H04L 63/1433 |

* cited by examiner

SYSTEMS AND METHODS FOR DYNAMICALLY CONCEALING SENSITIVE INFORMATION

CROSS REFERENCE TO RELATED APPLICATIONS

This application is a continuation of, and claims priority under 35 U.S.C. § 120 to, U.S. patent application Ser. No. 16/998,610, filed Aug. 20, 2020, the entire contents of which is fully incorporated herein by reference.

FIELD

The disclosed technology relates to systems and methods for dynamically concealing sensitive information in a shared screen video session.

BACKGROUND

Ever increasing internet connectivity and the globalization of commerce present in the modern business world has driven businesses to move many conferences to the virtual space. Videoconferencing meetings often bring together numerous users scattered around various locations, and may opt to screen share one or more applications running on their computing devices to the other participants of the video conference. However, a user of the video conference system may inadvertently reveal an article of sensitive information when he or she decides to screen share the document and/or application with the other participants of the video conference.

Accordingly, there is a need for more robust privacy system capable of detecting at least one article of sensitive information that may be present in a graphical user interface that is to be shared with participants in a video conference and concealing the article(s) before sharing the graphical user interface in a screen share mode of the video conference. Embodiments of the present disclosure are directed to this and other considerations.

SUMMARY

Disclosed herein are systems and methods for dynamically concealing sensitive information in a shared screen session of a video conference. Consistent with the disclosed embodiments, a system is provided for dynamically concealing sensitive information. The system includes one or more processors and memory in communication with the one or more processors and storing instructions that, when executed by the one or more processors, cause the system to perform one or more steps of a method for dynamically concealing sensitive information in a shared screen session of a video conference. The system may establish communication with a first computing device associated with a host. The first computing device may be in communication with one or more second computing devices that are each associated with a participant of the video conference. Each device in the video conference may be switchable between a shared screen mode and a video mode. The system may determine that one or more articles of sensitive information are visible in a first graphical user interface of the first computing device and receive a first signal from the first computing device that indicates an intent of the host to switch to the screen share mode that includes display of the first graphical user interface to the second computing devices. In response to the signal, the system may execute one or more privacy actions.

Consistent with the disclosed embodiments, a system is provided for dynamically concealing sensitive information. The system includes one or more processors and memory in communication with the one or more processors and storing instructions that, when executed by the one or more processors, cause the system to perform one or more steps of a method for dynamically concealing sensitive information in a shared screen session of a video conference. The system may receive, from a first computing device, a first signal indicative of the first computing device entering a screen share of a first graphical user interface with at least one second computing device over the video conference. The system may monitor the first graphical user interface for one or more articles of sensitive information and, in response to detecting a first article of sensitive information, the system may disable the screen share mode and enable a video mode to replace the screen share mode.

Consistent with the disclosed embodiments, a computer implemented method for collaboratively dynamically concealing sensitive information in a shared screen session of a video conference is disclosed. The method may include receiving, from a presenting computing device associated with a presenter, a first signal indicating an intent of the presenter to display a first graphical user interface associated with the presenting computing device as a first shared screen of the shared screen session. The first graphical user interface may be shared with at least one attendee computing device. The method may include monitoring the first graphical user interface for one or more articles of sensitive information. The method may include detecting a first presence of at least one article of sensitive information in the first graphical user interface. The method may include concealing the at least first article of sensitive information to form a modified graphical user interface and providing the graphical user interface to the presenting computing device for display to the at least one attendee computing device through the shared screen session of the video conference.

Further features of the disclosed design, and the advantages offered thereby, are explained in greater detail hereinafter with reference to specific embodiments illustrated in the accompanying drawings, wherein like elements are indicated by like reference designators.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings.

DETAILED DESCRIPTION

Some implementations of the disclosed technology will be described more fully with reference to the accompanying drawings. This disclosed technology, however, may be embodied in many different forms and should not be construed as limited to the implementations set forth herein. The components described hereinafter as making up various elements of the disclosed technology are intended to be illustrative and not restrictive. Many suitable components that could perform the same or similar functions as components described herein are intended to be embraced within the scope of the disclosed systems and methods. Such other components not described herein may include, but are not limited to, for example, components developed after development of the disclosed technology.

It is also to be understood that the mention of one or more method steps does not imply a particular order of operation or preclude the presence of additional method steps or intervening method steps between those steps expressly identified. Similarly, it is also to be understood that the mention of one or more components in a device or system does not preclude the presence of additional components or intervening components between those components expressly identified.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

Figure 1:
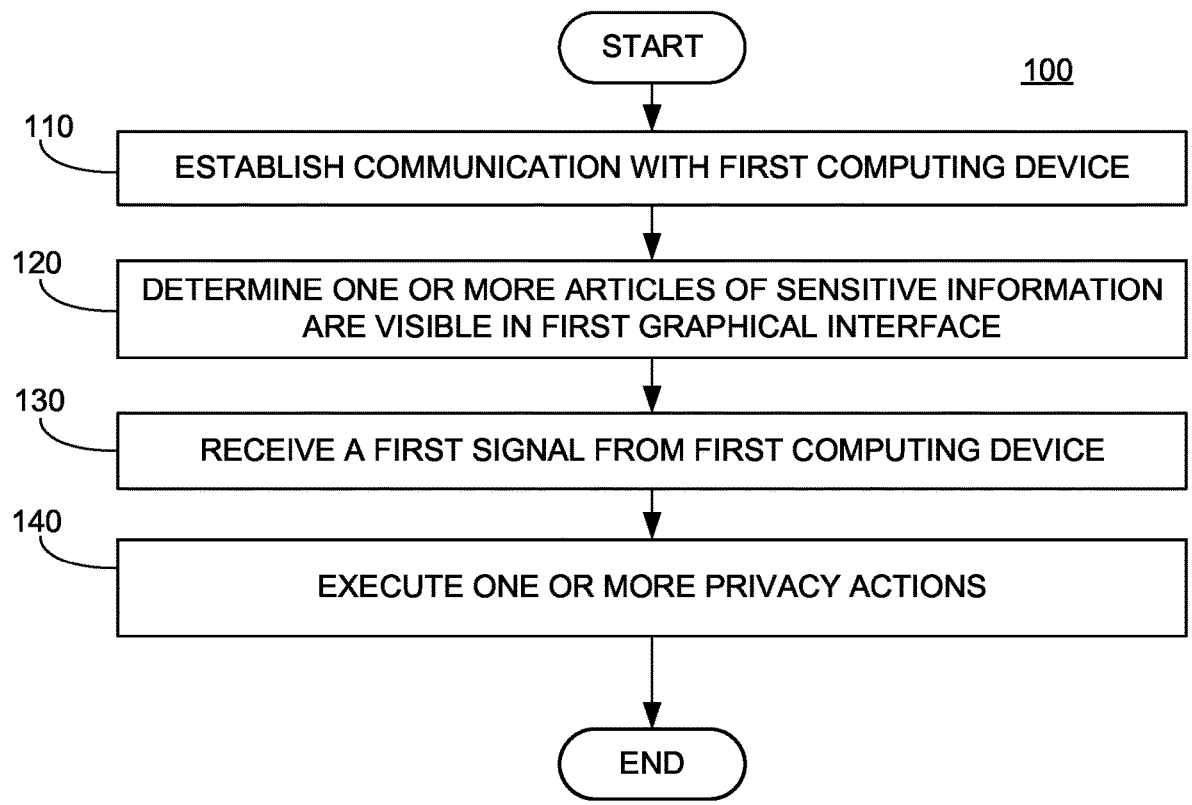
FIG. 1 is a flow chart of a method of dynamically concealing sensitive information, in accordance with some examples of the present disclosure.

FIG. 1 is a flow chart of a method of dynamically concealing sensitive information, in accordance with some examples of the present disclosure. Although steps in method 100 are described as being performed by the system (e.g., system 700 as described in more detail with respect to FIGS. 7-8), a person of ordinary skill in the art would understand that some or all of the steps of method 100 may be performed by one or more devices of the system (e.g., user device 720, as described in more detail with respect to FIGS. 7-8). As shown in FIG. 1, in step 110 of method 100, the system (e.g., system 700) may establish communication with a first computing device. The first computing device may be associated with a host of a video conference, and may be in active communication with one or more second computing devices. Each second computing device may be associated with a respective attendee of the video conference. Each computing device within the video conference may be capable of switching between a video mode, in which a video image associated with a respective user of a respective computing device may be shared with the other devices in the video conference, and a screen share mode, in which the respective user may share a screen associated with the respective computing device. For example, a host may wish to share a report, a slide show, or any other computer document and/or screen with the attendees of the video conference. Accordingly, the host may wish to use the screen share mode to share the images displayed on the graphical user interface (e.g., on the first graphical user interface of user device 720) of the host computing device. However, the host may inadvertently reveal one or more articles of sensitive information to the attendees of the video conference during the screen share mode. For example, the host may have multiple documents open in the graphical user interface, and at least one document may contain an article of sensitive information that the host does not wish to reveal to the attendees of the video conference.

In step 120, the system (e.g., privacy system 710) may determine one or more articles of sensitive information are visible in the first graphical user interface. For example, the privacy system may include one or more application programming interfaces ("API") for sending and receiving information from one or more applications running on the host computing device. (e.g., user device 720). For example, and as described in more detail with respect to FIG. 2, the system may determine that one or more applications are running on the host computing device, and that the one or applications include one or more template fields. As used herein, template fields may include any field in which data may be entered in an application running on a respective computing device. For example, an email application may include multiple template fields for each incoming and outgoing message, including a template field for a sender, a receiver, a subject line, a main message body, etc. A messaging application may include similar template fields for a message sender, a message recipient, a subject, and a message body. The system (e.g., privacy system 710) may include a database (e.g., database 860) that may be configured to store a plurality of predetermined templates corresponding to template fields of one or more applications. In some embodiments, the messaging application may cause one or more pop-ups to be displayed on the graphical user interface. In some embodiments, the system may recognize a template field containing a sensitive data entry in a given application without previously encountering the respective application. The template field may be identified based on exceeding a predetermined similarity to a previously identified template field from a similar application. The system may additionally detect templates containing potentially sensitive information in a graphical user interface associated with an operating system of a computing device. For example, the system may detect a folder or directory hierarchy associated with an operating system or application (e.g., Finder application on a Mac computing device, Windows Explorer on a computing device running the Windows operating system, and/or Gdrive in a web browser and/or on computing device running the Chrome OS).

In step 130, the system may receive a first signal from the host device. The first signal may indicate to the privacy system that the host intends to switch from the video mode to the shared screen mode in the video conference. In some embodiments, the first signal may include an input received from the host computing device and provided by the host user. For example, the host may provide an input (e.g., mouse click, keyboard entry, etc.) to the host computing device that indicates the host user's intent to switch to the shared screen mode. In other embodiments, the first signal may further include an audio queue provided by the host. For example, the host may utter a particular sequence of words indicative of the host's intention to switch to the screen share mode. For example, the host may say "Let me pull up the slide deck." The privacy system may include natural language processing capabilities to parse and process the utterances to detect one or more keywords indicative of the host's intent to begin screen sharing. For example, the system may receive data indicative of the audio queue from the host computing device and detect one or more keywords within the audio queue that are indicative of the host's intent to begin screen sharing.

Figure 8:
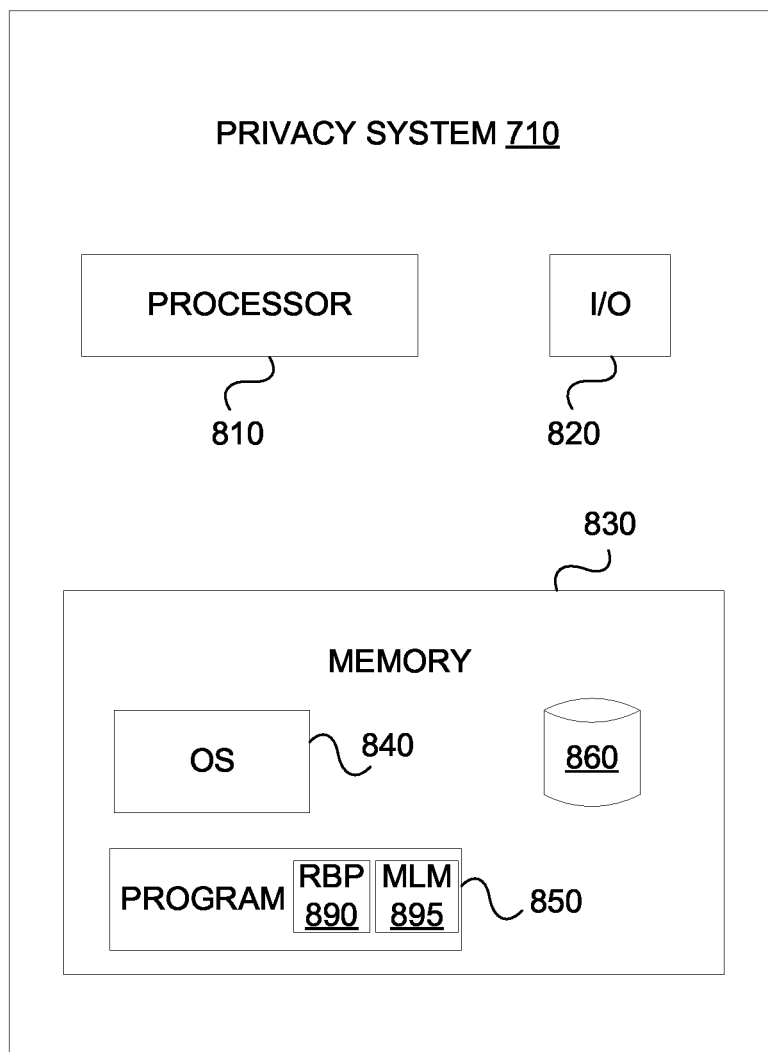
FIG. 8 is a component diagram of an exemplary privacy system.

In some embodiments, the system may include a trained classifier for detecting the intent of a host to switch to a screen share mode (e.g., via detecting the audio queue and translating the audio queue into an intent using NLP program 898, described in more detail with respect to FIG. 8). The system may train the classifier by aggregating training data including typical sentences that may indicate an intent of a host or user to begin screen sharing. Additionally, features of the audio queue that indicate intent may extracted. The system may extract such features using various algorithms, for example using bag-of-words feature extraction and/or by generating n-grams. Finally, using the extracted features and the training data sets, the system may train a classifier to determine which audio queues correspond to the intent to enable screen sharing. In some embodiments, methods such as xgboost, random forest, or various neural network models may be employed to train the classifier.

According to some example embodiments, one or more pretrained models may be implemented in tandem with the classifier. For example, the system may implement a pretrained BERT NLP language model, ELMO NLP language model, and/or GLOVE NLP language model in tandem with the classifier, which may be implemented as a feed-forward neural network with a softmax function to make predictions of intent based on input audio queues. When using a model such as BERT, ELMO, and/or GLOVE in tandem with the classifier, the classifier may need training while the BERT/ELMO/GLOVE models may be pretrained. This training process may be referred to as fine-tuning, and is related to semi-supervised sequence learning. BERT/ELMO/GLOVE may be understood as a trained combined transformer and encoder. A transformer may be understood as a model that uses attention mechanisms to boost the speed and accuracy of the predictions generated by the models. Attention mechanisms allow a neural network to assign weights to words allowing the model to make complex associations between each word in a given input sentence. For example, in the sentence "the animal didn't cross the street because it was too tired," an attention mechanism may enable the NLP model to determine whether the word "it" corresponds to the "street" or the "animal." Accordingly, in some embodiments, the system may be configured to utilize a pretrained model such as BERT, ELMO, or GLOVE in tandem with a classifier specifically configured for determining intent from audio queues. The pretrained model may be trained on a large volume of generalized training data, and may enable the privacy system 700 with a large context of learned words and corresponding intents. In combination with the task-specific classifier, the privacy may make accurate predictions of intent based on audio queues and may result in a significantly faster training of the classifier based on the existing trained BERT/ELMO/GLOVE models. Accordingly, the pre-trained BERT model may create contextualized word embeddings based on the input audio queues and these embeddings are fed to the classifier to train on the specific task of extracting intent to switch to a screen sharing mode during the videoconference.

In step 140, privacy system 700 may execute one or more privacy actions in response to the first signal. In some embodiments, the one or more privacy actions may include concealing the detected sensitive information in the first graphical user interface of the host to generate a second graphical user interface to provide for display on the one or more second computing devices associated with the attendees. For example, the host may wish to share a slide deck with the attendees of the video conference. The system may determine that the slide deck application may include at least one template field that indicates an article of sensitive of information. For example, the system may detect a template field in the form of XXX-XX-XXXX. In response, the system may determine that the template field corresponds to a social security number entry and selectively conceal the entry for the respective template field. In some embodiments, when a template field matches a predetermined template indicative of sensitive information, the system may parse the data entry in the respective template field to further determine whether the template field includes sensitive information. For example, the system may scan an entry in the template field XXX-XX-XXXX and determine that the template data entry includes a sequence of numbers and letters. Based on this finding, the system may determine that the data entry is not a social security number and may not correspond to sensitive information. In another example, the system may be trained to recognize predetermined templates indicative of phone numbers, bank account numbers, and email addresses. For phone numbers, the system may determine a template in the form of (XXX)-XXX-XXXX. For bank account numbers, the system may determine a template in the form of 10 to 12-digit entry. For credit card numbers, the system may identify a template including a 16-digit entry. In some embodiments, the system may include a sequential neural network configured to identify the entries in the template and determine whether the data entries correspond to sensitive information beyond a predetermined threshold. In some embodiments, the one or more privacy actions may include causing the host device to switch from screen share mode to video mode to conceal the one or more articles of sensitive information detected in the first graphical user interface. In some embodiments, executing one or more privacy actions may further include detecting a pop-up containing at least one article of sensitive information and concealing the sensitive information present in the pop-up (as described in more detail with respect to FIG. 3).

In some embodiments, the one or more privacy actions may be based in part on user security preferences. For example, the host of the videoconference may input security preferences associated with the videoconferencing application. On one extreme, the system (e.g., privacy system 710) may favor higher security over convenience. Accordingly, in these embodiments, the system may immediately disable the screen share mode when a new article of sensitive information is detected in the graphical user interface being shared with the computing devices associated with the attendees of the videoconference. On the other hand, if the host values convenience and a smoother user experience over privacy, the system may be configured to conceal the sensitive information in substantially real time as the respective article of sensitive information is detected in the graphical user interface without first disabling the screen share mode. Accordingly, in some embodiments, the article of sensitive information may be briefly exposed to the attendee computing devices before the privacy system 710 conceals the article in substantially real time. In some embodiments, the article of sensitive information may be present when a pop-up message appears on the graphical user interface. According to the user security preferences, the system may automatically conceal any pop-up present on the graphical user interface without confirming whether the pop-up contains an article of sensitive information when the user security preferences indicate a preference for a higher level of security, or in other embodiments, the system may first verify whether the pop-up contains at least one article of sensitive information before concealing the pop-up. In this case, the system may conceal the article of sensitive information in substantially real time, although the article may be briefly revealed to the attendees before being concealed. Any user of the video conferencing system may be able to adjust his or her user security preferences to adjust how aggressively the privacy system conceals potentially sensitive information detected in the graphical user interface being shared in the shared screen session.

Figure 2:
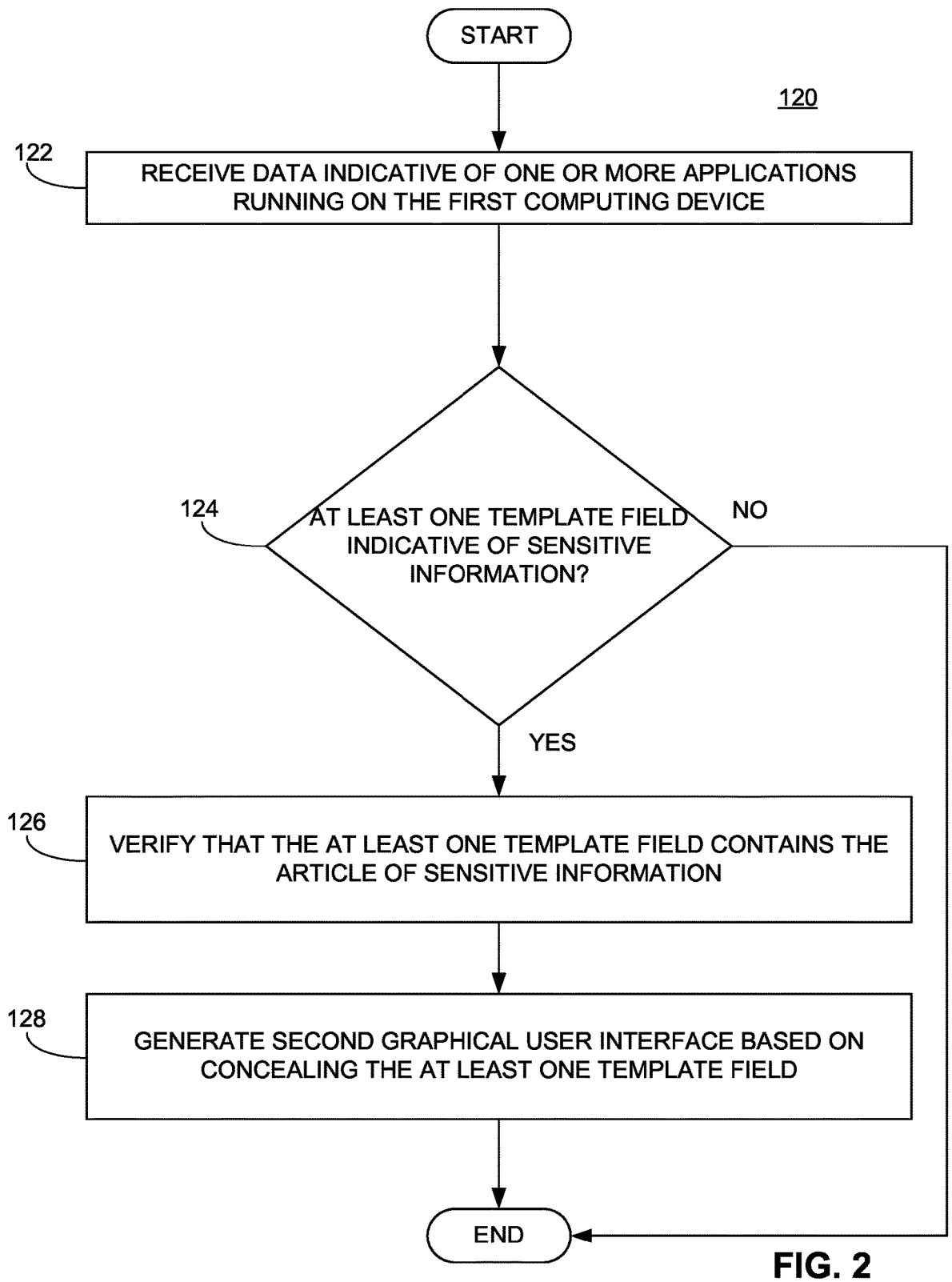
FIG. 2 is a flow chart of a method of determining whether one or more articles of sensitive information are visible in a graphical user interface, in accordance with some examples of the present disclosure.

FIG. 2 is a flow chart of a method of determining whether one or more articles of sensitive information are visible in a graphical user interface, in accordance with some examples of the present disclosure. In step 122 of method 120, the system may receive data indicative of one or more applications running on the first computing device. For example, privacy system 700 may query user device 720 (e.g. host/ first computing device) to transmit data indicative of the applications currently operating on the user device. The system may further determine whether the one or more applications have at least one template field that correlates to one of a plurality of predetermined template fields. For example, if the privacy system detects a template field in the of XXX-XX-XXXX, the system may determine that the template field is correlated to a template field for entry of a social security number. In decision block 124, the system may compare each detected template field in the one or more running applications to one or more predetermined template fields that are stored on the privacy system (e.g. on database 860). If the detected template field exceeds a predetermined threshold to one of the one or more predetermined template fields, the system may verify that the at least one template field contains an article of sensitive information in step 126. If the detected template fields are not indicative of one or more articles of sensitive information, the method may end. After verifying that the at least one template field contains an article of sensitive information, the system may generate a second graphical user interface based on concealing the at least one template field in step 128.

Figure 3:
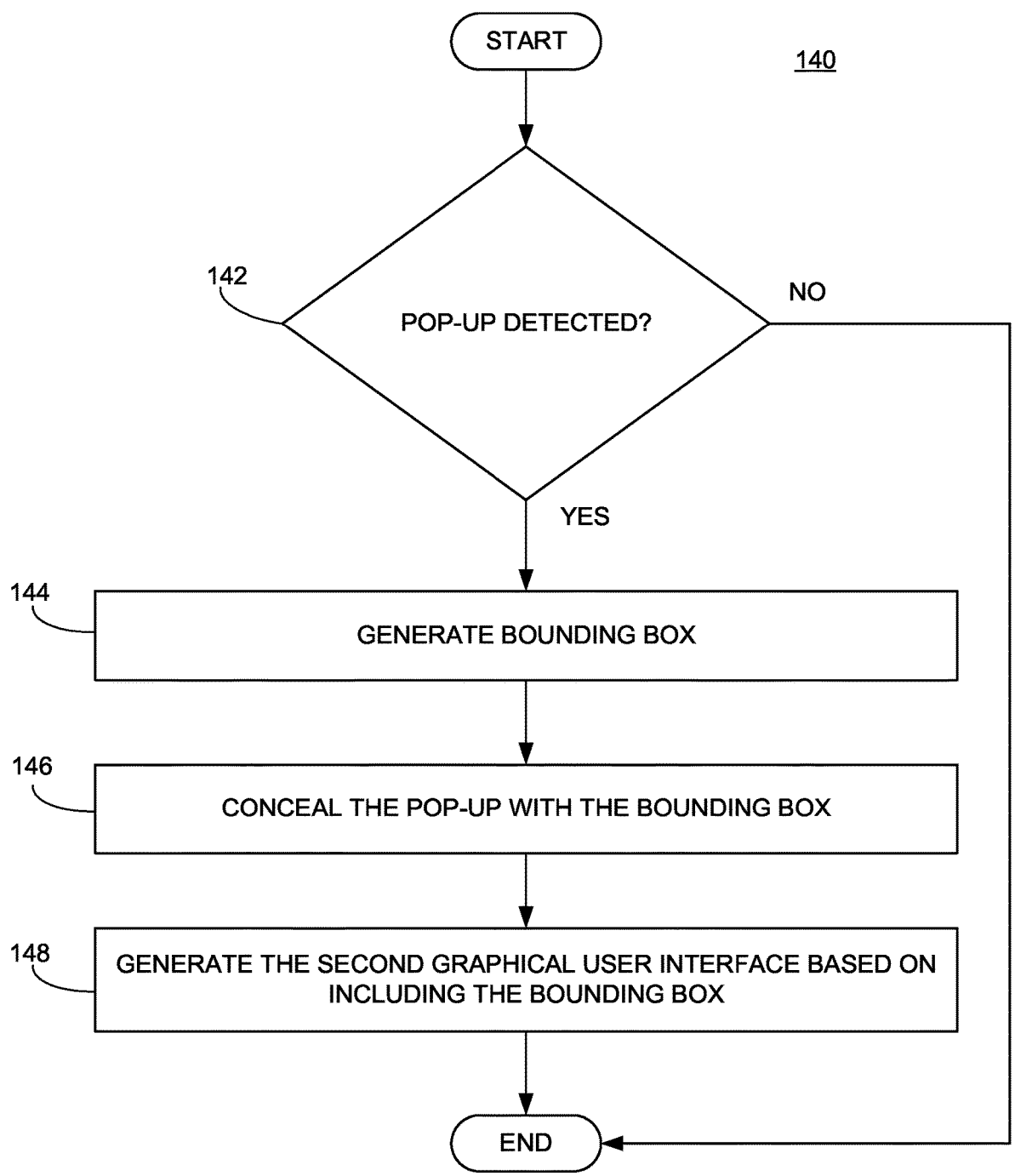
FIG. 3 is a flow chart of a method of executing one or more privacy actions, in accordance with some examples of the present disclosure.

FIG. 3 is a flow chart of a method of executing one or more privacy actions, in accordance with some examples of the present disclosure. In decision block 142 of method 140, the system may determine whether a pop-up is detected within the first graphical user interface. For example, a pop-up may be associated with a messaging program operating on the first computing device. In some embodiments, when the host receives a message in the messaging program, a pop-up may appear. Accordingly, the system may detect the pop-up within the first graphical user interface. When no pop-up is detected, the method may end. When a pop-up is detected, the system may generate a bounding box in step 144. The bounding box may be approximate the size of the pop-up detected in step 142 and located in the same location as the pop-up within the graphical user interface. For example, if the detected pop-up is approximately 200 pixels by 200 pixels, the generated bounding box may also be approximately 200 pixels by 200 pixels. In step 146, the system may conceal the pop-up box with bounding box generated in step 144. Finally, in step 148, the system may generate a second graphical user interface based on applying the bounding box to the first graphical user interface. The bounding box may serve to obfuscate any sensitive information that may be contained in the pop-up so that the attendees are not able to view the information contained in the pop-up even while the host continues to provide the shared screen to the attendees.

Figure 4:
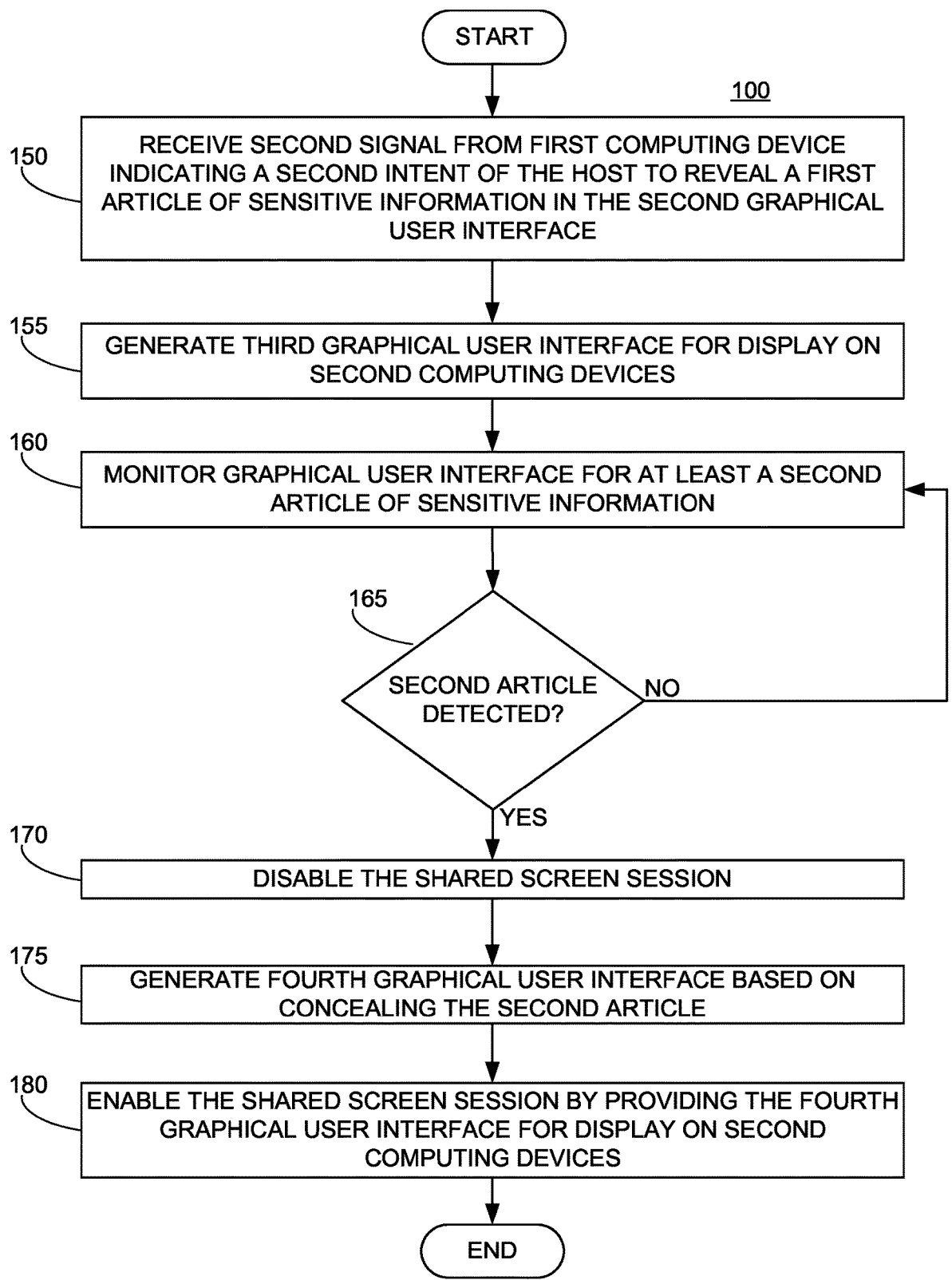
FIG. 4 is a flow chart of a method of dynamically revealing sensitive information in accordance with some examples of the present disclosure.

FIG. 4 is a flow chart of a method of dynamically revealing sensitive information in accordance with some examples of the present disclosure. In some embodiments, the host may wish to override the concealment of the one or more articles of private information so that the host may include the sensitive information in the shared screen session of the video conference. In step 150 of method 100, the system may receive a second signal from the first computing device. The second signal may indicate a second intent of the host to reveal a first article of sensitive information in the second graphical user interface that is being shared with the attendee computing devices. For example, the host may use his or her mouse or keyboard to highlight and/or click on a field that contains the at least one article of sensitive information that the host wishes to reveal to the attendees of the video conference. In step 155, the system may generate a third graphical user interface for display on the attendee computing devices. For example, the third graphical user interface may be based off selectively revealing the first article of sensitive information in the second graphical user interface to generate the third graphical user interface. In step 160, the system may monitor the third graphical user interface provided to the attendee computing devices for at least a second article of sensitive information. Although the host may wish to reveal one article of sensitive information, the host does not necessarily wish to reveal any other articles of sensitive information. Accordingly, the system may continuously monitor the graphical user interface to prevent the attendee computing devices from being able to view any other articles of sensitive information.

In decision block 165, the system may determine whether the second article of sensitive information is detected in the third graphical user interface being shared with the attendee computing devices. For example, the system may detect a pop-up message associated with a messaging application running on the host computing device that appears on the third graphical user interface being shared with the attendee computing devices. In response, the system may disable the shared screen session in step 170 and return the host computing device to video mode. When the second article of sensitive information is not detected in decision block 165, the method moves to step 160, in which the system continues to monitor the graphical user interface for at least a second article of sensitive information. In step 175, the system may generate a fourth graphical user interface based on concealing the second article in the third graphical user interface. In step 180, the system may enable the shared screen session by providing the fourth graphical user interface for display on the attendee computing devices.

Figure 5:
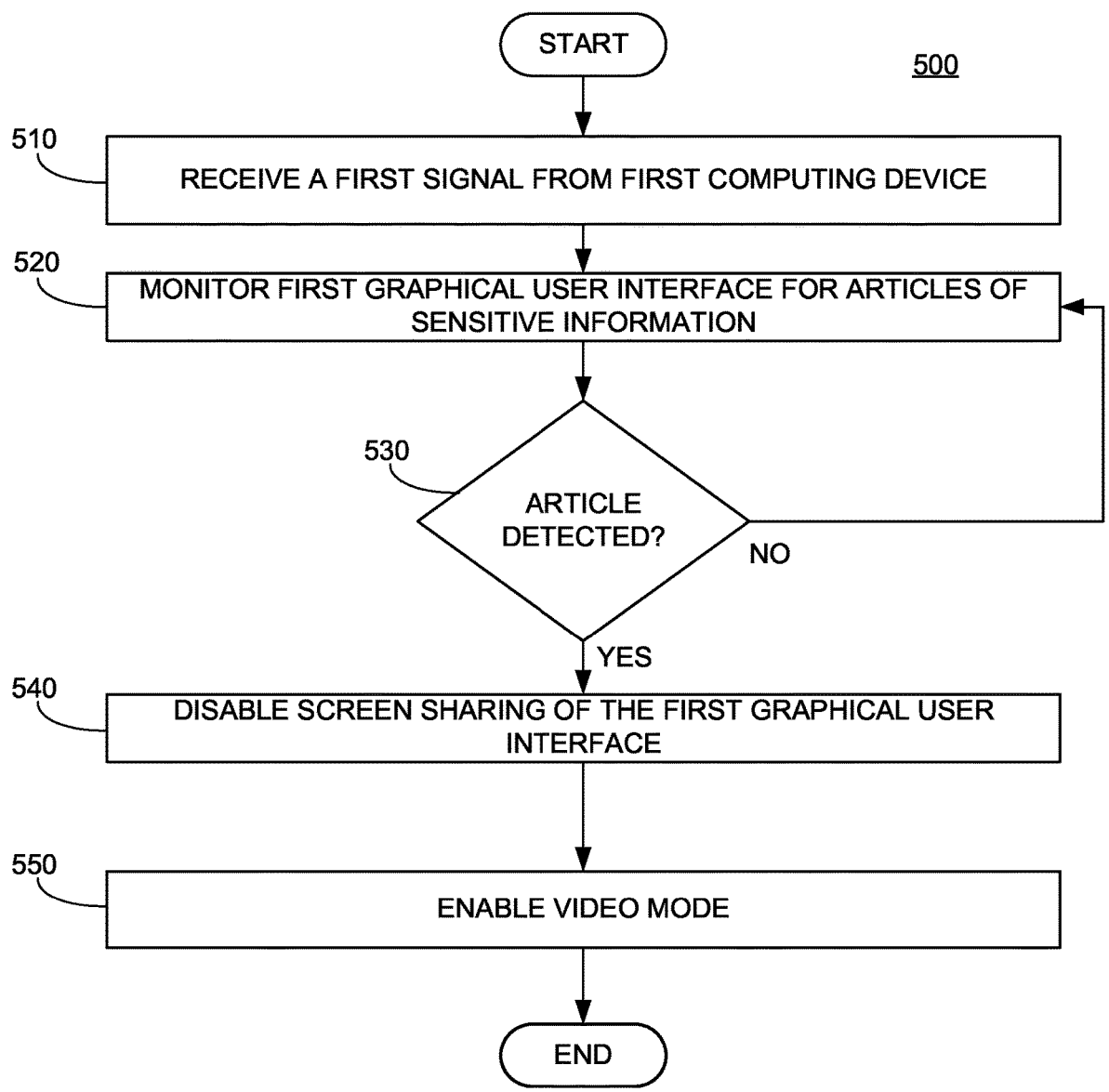
FIG. 5 is a flow chart of another method of dynamically concealing sensitive information in accordance with some examples of the present disclosure.

FIG. 5 is a flow chart of another method of dynamically concealing sensitive information in accordance with some examples of the present disclosure. In step 510 of method 500, the system (e.g., privacy system 700) may receive a first signal from a first computing device. As described with respect to FIG. 1, the first computing device may be associated with a host of a video conference, and may be in active communication with one or more second computing devices. Each second computing device may be associated with a respective attendee of the video conference. Each computing device within the video conference may be capable of switching between a video mode, in which a video image associated with a respective user of a respective computing device may be shared with the other devices in the video conference, and a screen share mode, in which the respective user may share a screen associated with the respective computing device. The first signal may indicate to the privacy system that the host intends to switch from the video mode to the shared screen mode in the video conference. In some embodiments, the first signal may include an input received from the host computing device and provided by the host user. For example, the host may provide an input (e.g., mouse click, keyboard entry, etc.) to the host computing device that indicates the host user's intent to switch to the shared screen mode. In other embodiments, the first signal may further include an audio queue provided by the host. For example, the host may utter a particular sequence of words indicative of the host's intention to switch to the screen share mode. For example, the host may say "Let me pull up the slide deck." The privacy system may include natural language processing capabilities to parse and process the utterances to detect one or more keywords indicative of the host's intent to begin screen sharing. For example, the system may receive data indicative of the audio queue from the host computing device and detect one or more keywords within the audio queue that are indicative of the host's intent to begin screen sharing.

In step 520, the system may monitor the first graphical user interface for one or more articles of sensitive information. In response to receiving the first signal in step 510, the system may enable the screen share mode for the host of the video conference. For example, the privacy system 700 may transmit an instruction to the videoconferencing application running on the host computing device to transition from video mode to a screen share mode. With the first graphical user interface being shared in screen share mode with the attendee computing devices, the system may continue to monitor the first graphical user interface for a presence of one or more articles of sensitive of information. The articles of sensitive information may present themselves anywhere in the first graphical user interface. For example, the sensitive information may correspond be present in the title of a folder of a program running on the host computing device, in a pop-up message, in the contents of an email or other electronic message, in an attachment to an email or electronic message, etc.

In decision block 530, the system determines whether one or more articles of sensitive information have been detected. If one or more articles of sensitive information have not been detected the method moves back to step 520. If the system detects one or more articles of sensitive information, the system may cause the host computing device to disable screen sharing of the first graphical user interface in step 540. In step 550, the system may cause the host computing device to enable video mode. By transitioning to video mode when the screen sharing is disabled, the system enables a smoother user experience wherein the attendees are less jarred by the shared screen session being disabled. In some embodiments, the video mode may include a video of the respective host or attendee of the computing device. In some embodiments, the video mode may instead include a waiting indicator and/or a profile photograph of the respective user while the system hides the one or more articles of sensitive information from view of the attendee computing devices.

Figure 6:
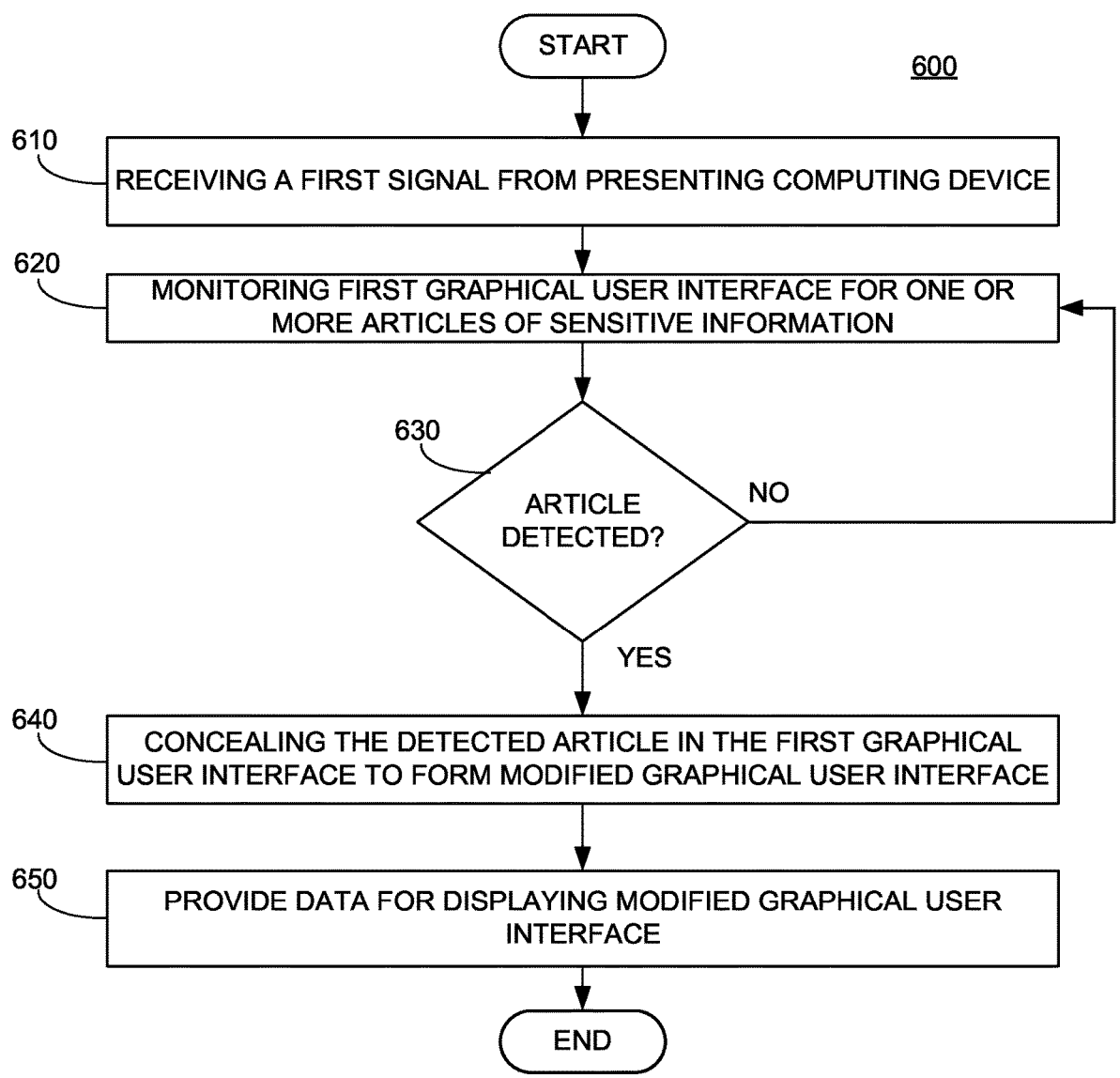
FIG. 6 is a flow chart of yet another method of dynamically concealing sensitive information in accordance with some examples of the present disclosure.

FIG. 6 is a flow chart of yet another method of dynamically concealing sensitive information in accordance with some examples of the present disclosure. In step 610 of method 600, the system (e.g., privacy system 700) may receive a first signal from a first computing device. As described with respect to FIG. 1, the first computing device may be associated with a host of a video conference, and may be in active communication with one or more second computing devices. Each second computing device may be associated with a respective attendee of the video conference. Each computing device within the video conference may be capable of switching between a video mode, in which a video image associated with a respective user of a respective computing device may be shared with the other devices in the video conference, and a screen share mode, in which the respective user may share a screen associated with the respective computing device. The first signal may indicate to the privacy system that the host intends to switch from the video mode to the shared screen mode in the video conference. In some embodiments, the first signal may include an input received from the host computing device and provided by the host user. For example, the host may provide an input (e.g., mouse click, keyboard entry, etc.) to the host computing device that indicates the host user's intent to switch to the shared screen mode. In other embodiments, the first signal may further include an audio queue provided by the host. For example, the host may utter a particular sequence of words indicative of the host's intention to switch to the screen share mode. For example, the host may say "Let me pull up the slide deck." The privacy system may include natural language processing capabilities to parse and process the utterances to detect one or more keywords indicative of the host's intent to begin screen sharing. For example, the system may receive data indicative of the audio queue from the host computing device and detect one or more keywords within the audio queue that are indicative of the host's intent to begin screen sharing.

In step 620, the system may monitor the first graphical user interface for one or more articles of sensitive information. In response to receiving the first signal in step 610, the system may enable the screen share mode for the host of the video conference. For example, the privacy system 700 may transmit an instruction to the videoconferencing application running on the host computing device to transition from video mode to a screen share mode. With the first graphical user interface being shared in screen share mode with the attendee computing devices, the system may continue to monitor the first graphical user interface for a presence of one or more articles of sensitive of information.

In decision block 630, the system determines whether one or more articles of sensitive information have been detected. If one or more articles of sensitive information have not been detected the method moves back to step 520. If the system detects one or more articles of sensitive information, the system may conceal the detected article in the first graphical user interface to form a modified graphical user interface in step 640. For example, the system may conceal the detected sensitive information in the first graphical user interface of the host to generate a second graphical user interface to provide for display on the one or more second computing devices associated with the attendees. For example, the host may wish to share a slide deck with the attendees of the video conference. The system may determine that the slide deck application may include at least one template field that indicates an article of sensitive of information. For example, the system may detect a template field in the form of XXX-XX-XXXX. In response, the system may determine that the template field corresponds to a social security number entry and selectively conceal the entry for the respective template field. In some embodiments, the one or more privacy actions may include causing the host device to switch from screen share mode to video mode to conceal the one or more articles of sensitive information detected in the first graphical user interface. In some embodiments, executing one or more privacy actions may further include detecting a pop-up containing at least one article of sensitive information and concealing the sensitive information present in the pop-up (as described in more detail with respect to FIG. 3). In step 650, the system may provide data to the host computing device for display of the modified graphical user interface to the attendee computing devices.

Figure 7:
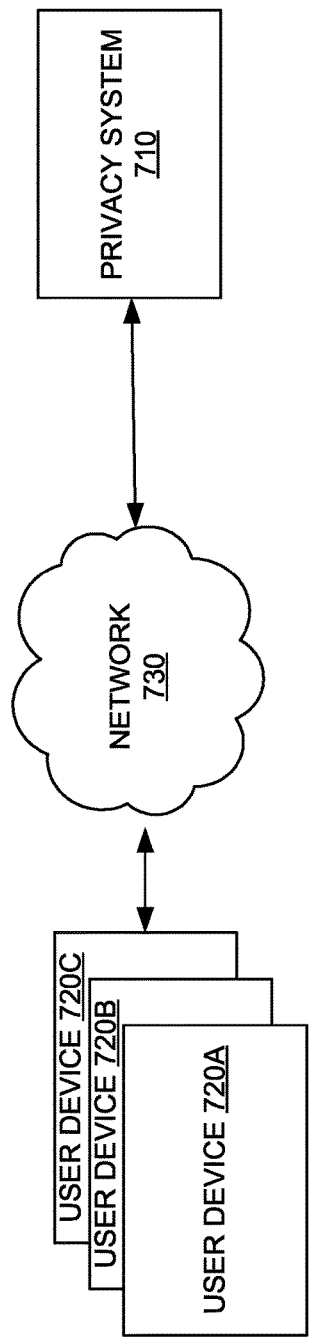
FIG. 7 illustrates an exemplary privacy system consistent with the disclosed embodiments.

FIG. 7 depicts an example privacy system according to an example implementation of the disclosed technology. The example system 700 may include a plurality of devices connected by a network 730. The system 100 may include a plurality of user devices 720 (individually 720A, 720B, etc.). Each user device may be associated with a host and/or attendee of a video conference and exclusively capable of enabling a shared screen mode to share the graphical user interface of their respective user device 720. It is to be understood that any user device 720 (e.g., user device 720A) may be capable of hosting the video conference or participating as an attendee of the video conference. User devices 720 can include one or more of a mobile device, smart phone, general purpose computer, tablet computer, laptop computer, telephone, PSTN landline, smart wearable device, voice command device, other mobile computing device, or any other device capable of communicating with the network 730 and ultimately communicating with one or more components of the system 700. In some embodiments, user devices 720 may include or incorporate electronic communication devices for hearing or vision impaired users. According to some embodiments, user devices 720 may include an environmental sensor for obtaining audio or visual data, such as a microphone and/or digital camera, a geographic location sensor for determining the location of the device, an input/output device such as a transceiver for sending and receiving data, a display for displaying digital images, one or more processors, and a memory in communication with the one or more processors.

Further, the system 700 may be in communication (e.g., via the network 730) with a privacy system 710. As described in more detail with respect to FIG. 8, the privacy system is configured to establish communication with a host computing device (e.g., user device 720A) of the privacy system, wherein the host computing device is in a video conference session with one or more attendee computing devices (e.g., user device(s) 720A and 720B). Privacy system 710 may be configured with a natural language processing (NLP) program 898 configured to interpret audio queues received from the host device that are indicative of an intent of the host to enable a screen share mode of the video conference (e.g., using a trained classifier, or a combination of a pretrained model, such as BERT, with the trained classifier, as described with respect to FIG. 1). For example, privacy system 710 may receive an utterance from the host such as "Let me pull up the slide show presentation." The system may compare the received audio queue to previous audio queues stored in the system to determine a confidence interval associated with the host's intent to enable screen sharing. Accordingly, if privacy system 710 determines that the audio queue has a confidence interval exceeding a predetermined threshold, the audio queue is determined to be indicative of the host's intent to switch to a screen share mode of the video conference.

In some embodiments, the privacy system 710 may be used to implement an automated natural language processing program system that may translate an audio queue received from a user device 720 into machine readable code that may be interpreted by the privacy system 710. The privacy system may be programmed with a rule-based platform that may be used to identify a user's intent to enter a screen share mode in a video conference. The intent may be identified based on an input received from a host computing device (e.g., user device 720A), such as a button click, an audio queue, and the like.

Privacy system 710, may include one or more computer systems configured to compile data from every video conference session in which the system is employed. Privacy system 710 may correlate compiled data, analyzed the compiled data, arrange the compiled data, generate derived data based on the compiled data, and store the compiled and derived data in a database (e.g., database 860). The database may be used by privacy system 710 to store trained audio queues that may be used to determine whether a host of a video conference currently intends to switch to screen sharing in which at least one article of sensitive information may be inadvertently displayed. Database 860 may also be configured to store data predetermined templates associated with one or more programs running on one the user devices 720. Privacy system 710 may also include one or more application program interfaces (APIs) that provide various functionalities related to the operations of the system 700. In some embodiments, privacy system 710 may include API adapters that enable the privacy system 710 to interface with and utilize enterprise APIs maintained by organizations and associated entities that are associated with the one or more programs running on the user devices 720. In some embodiments, APIs can provide functions that include, for example, determining whether any of the one or more programs running on user devices 720 include a template for data entries for potentially sensitive or private information which should not be revealed during a screen share session in a video conference. The APIs may also provide the function of detecting an incoming pop-up message visible on a graphical user interface running on one of the user devices 720 (e.g., the host device) and allowing the privacy system to respond by generating a bounding box of the approximate size of the detected pop-up and providing instructions to the respective user device 720 to conceal the pop-up with the bounding box. In certain embodiments, real-time APIs consistent with certain disclosed embodiments may use Representational State Transfer (REST) style architecture, and in this scenario, the real time API may be called a RESTful API.

In certain embodiments, a real-time API may include a set of Hypertext Transfer Protocol (HTTP) request messages and a definition of the structure of response messages. In certain aspects, the API may allow a software application, which is written against the API and installed on a client (such as, for example, user devices 720) to exchange data with a system that implements the API (such as, for example, the privacy system 710), in a request-response pattern. In certain embodiments, the request-response pattern defined by the API may be configured in a synchronous fashion and may require that the response be provided in real-time. In some embodiments, a response message from the server to the client through the API consistent with the disclosed embodiments may be in formats including, for example, Extensible Markup Language (XML), JavaScript Object Notation (JSON), and/or the like.

In some embodiments, the API design may also designate specific request methods for a client to access the server. For example, the client may send GET and POST requests with parameters URL-encoded (GET) in the query string or form-encoded (POST) in the body (e.g., a form submission). In certain example implementations, the client may send GET and POST requests with JSON serialized parameters in the body. Preferably, the requests with JSON serialized parameters use "application/j son" content-type. In another aspect, an API design may also require the server implementing the API return messages in JSON format in response to the request calls from the client.

In accordance with certain example implementations of the disclosed technology, the privacy system 710 may be configured to receive and process incoming messages and determine a meaning of the incoming message using NLP methods enabled by NLP program 898. For example, the privacy system 710 may be configured to determine the meaning of an incoming audio queue from one of the user devices 720.

Facilitating communication between components of system 700, the network 730 may be of any suitable type, including individual connections via the Internet such as cellular or WiFi networks. In some embodiments, the network 730 may connect terminals, services, and mobile devices using direct connections such as radio-frequency identification (RFID), near-field communication (NFC), Bluetooth™, low-energy Bluetooth™ (BLE), WiFi™, Ethernet, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

As shown in more detail in FIG. 8, privacy system 710 may include a processor 810, an input/output ("I/O") device 820, a memory 830 containing an operating system ("OS") 840, one or more program(s) 850, and a database 860. For example, privacy system 810 may be a single device or server or may be configured as a distributed computer system including multiple servers, devices, or computers that interoperate to perform one or more of the processes and functionalities associated with the disclosed embodiments. In some embodiments, privacy system 710 may further include a peripheral interface, a transceiver, a mobile network interface in communication with the processor 810, a bus configured to facilitate communication between the various components of privacy system 710, and a power source configured to power one or more components of privacy system 710. Servers, databases, and other computing devices (e.g., the user devices 720) included in the system 700 may include many components that are similar to or even have the same capabilities as those described with respect to privacy system 710. In some embodiments, privacy system may include an API running locally on one or more user devices 720 that allow the privacy system 710 to directly communicate and provide instructions to user devices 720.

A peripheral interface may include hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general-purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, a local area network, or another wide-area network. In some embodiments, a mobile network interface may include hardware, firmware, and/or software that allows the processor(s) 810 to communicate with other devices via wired or wireless networks, whether local or wide area, private or public, as known in the art. A power source may be configured to provide an appropriate alternating current (AC) or direct current (DC) to power components.

The processor 810 may include one or more of a microprocessor, microcontroller, digital signal processor, co-processor or the like or combinations thereof capable of executing stored instructions and operating upon stored data. The memory 830 may include, in some implementations, one or more suitable types of memory (e.g., such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the memory 830.

The processor 810 may be one or more known processing devices, such as a microprocessor from the Pentium™ family manufactured by Intel™ or the Turion™ family manufactured by AMD™. The processor 810 may constitute a single core or multiple core processor that executes parallel processes simultaneously. For example, the processor 810 may be a single core processor that is configured with virtual processing technologies. In certain embodiments, the processor 810 may use logical processors to simultaneously execute and control multiple processes. The processor 810 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

Privacy system 710 may include one or more storage devices configured to store information used by the processor 810 (or other components) to perform certain functions related to the disclosed embodiments. In some embodiments, the privacy system 710 may include a memory 830 that includes instructions to enable processor 810 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, privacy system may include memory 830 that includes instructions that, when executed by the processor 810, perform one or more processes consistent with the functionalities disclosed herein. Methods, systems, and articles of manufacture consistent with disclosed embodiments are not limited to separate programs or computers configured to perform dedicated tasks. For example, privacy system 710 may include memory 830 that may include one or more programs 850 to perform one or more functions of the disclosed embodiments. Moreover, the processor 810 may execute one or more programs 850 located remotely from the privacy system 710 (e.g., a program operating on a user device 720). For example, privacy system 710 may access one or more remote programs 850, that, when executed, perform functions related to disclosed embodiments.

In certain example implementations, the program 850 that may include a rule-based platform 890 for determining whether a signal received from a user device may correspond to an intent of the user to transition to a screen share mode during a video conference session. In some embodiments, privacy system may include a trained machine learning model 895 for determining whether an application running on a user device 720 includes a template for the entry of potentially sensitive information, in accordance with a model that may be continuously or intermittently updated. Moreover, the processor 810 may execute one or more programs 850 located remotely from privacy system 710 (such as user devices 720). For example, privacy system 710 may access one or more remote programs 850 (such as the rule-based platform 890 or the trained machine learning model 895), that, when executed, perform functions related to disclosed embodiments. According to an example implementation of the disclosed technology, information received from the one or more applications running on the user devices 720 via one or more APIs operating on privacy system may allow the system to determine whether a respective program includes a template for entry of potentially sensitive information, and enables the privacy system 720 to parse the template entry to identify the presence of an article of sensitive information which should be concealed if a user attempts to initiate a screen share mode during the video conference. The template may be compared to one or more existing templates stored on privacy system 710 (e.g., in database 860), and in some use cases the privacy system determines whether one or more existing templates may be applied to the template based on a confidence interval exceeding a predetermined threshold. In some use cases privacy system 710 may make the determination using the trained machine learning model 895, the rules based platform 890, or a combination of both as a way of enhancing the performance of the rules based platform 890, for example, by determining which rules have priority over other rules and what rules should be applied in a given context.

According to some embodiments, an privacy system 710 may utilize deep learning models such as a convolutional neural network (CNN) that transforms a word into a word vector and long short-term memory (LSTM) that transforms a sequence of word vectors into intent to determine an intent of a user of the system to enable a screen share mode in a video conference. The model may also be trained to recognize named entities in addition to intents. For example, a named entity may be a program operating on the user device 720. For example, "Let me pull up that word document," may be interpreted by the system to include an intent (beginning a screen share session) and a program running on the respective user device 720 (e.g., Microsoft™ Word, WordPerfect™, etc.). According to some embodiments, the privacy system 710 may utilize NLP program 898 in order to translate an utterance of the host or attendee into an intent to initialize screen sharing. Upon receiving the audio queue, the privacy system 710 may extract the intent of the audio queue and translate the intent into a format that other computing devices can process.

According to some embodiments, the trained machine learning model 895 may be trained by updating a database (e.g. database 860) with the results of previous videoconferencing sessions in which the privacy system 710 has been implemented to autonomously hide sensitive information from attendee computing devices and that have been labeled using, for example, a web user interface. The data in the database 860 may undergo supervised training in a neural network model using a neural network training algorithm while the model is offline and before being deployed into system 700.

According to some embodiments, the machine learning module 895 may extract heuristics and/or additional case-based logic to be added to, for example, the rule-based platform 890. Accordingly, when system 700 detects a new template with similarities to a predetermined template, the system may be capable of determining that the template may contain an article of sensitive information based on the similarity to the predetermined template (e.g., previously stored in database 860). Thus, system 100 is capable of expanding its case-based reasoning supplied by rule-based platform 890 by utilizing machine learning techniques enabled by machine learning module 895.

According to some embodiments, system 700 may be configured to dynamically adapt to a user's preferences. For example, when system 700 detects a template indicative of an article of sensitive information, the system may generate a notification to present to the user of the respective computing device requesting confirmation of the sensitive article of information and whether the user wishes for it to be hidden in a screen share session of a videoconference. A confirmation received from the user (e.g., via an input to the respective computing device as described in more detail with respect to FIG. 1) may be used as training data to update the machine learning predictions generated by the machine learning module 895. According to some embodiments, the machine learning module 895 may be retrained after a predetermined number of observations (e.g. a predetermined number of identifications of articles of sensitive information). In some embodiments, when the system identifies a template that does not exceed a predetermined threshold to a predetermined template indicative of an article of sensitive information, the system may generate a notification requesting confirmation of the presence of a sensitive article of information as described with respect to generating training data. Accordingly, the system prompt the user to verify the presence of an article of sensitive information, which may also iteratively increase the predictive accuracy of the model (e.g., by expanding the case-based reasoning supplied by rule-based platform 890 and/or refining the machine learning model employed by machine learning module 895).

Intent classification may include mapping text, audio, video, or other media into an intent chosen from a set of intents, which represent what a customer is stating, uttering, requesting, commanding, asking, or promising in, for example, an incoming customer message. Intent classifications may include, for example, a request for an explanation for a perceived irregularity, a request for a confirmation, an indication of satisfaction, or any other intent a customer may have in communicating a message. Named entity recognition may involve identifying named entities such as persons, places, organizations, account types, and product types in text, audio, video, or other media.

The memory 830 may include one or more memory devices that store data and instructions used to perform one or more features of the disclosed embodiments. The Memory 830 may also include any combination of one or more databases controlled by memory controller devices (e.g., server(s), etc.) or software, such as document management systems, Microsoft™ SQL databases, Mongo databases, SharePoint™ databases, Oracle™ databases, Sybase™ databases, or other relational or non-relational databases. The memory 830 may also include software, such as Hadoop™, enabling the system to store and process large volumes of data distributed across a cluster of commodity servers and commodity storage connected via the network 730. The memory 830 databases may consist of files on the system 700 that are simply read into the memory, and the disclosed embodiments are not limited to separate databases or even to the use of a database. The memory 830 may include software components that, when executed by the processor 810, perform one or more processes consistent with the disclosed embodiments. In some embodiments, the memory 830 may include a database 860 for storing related data to enable the system 700 to perform one or more of the processes and functionalities associated with the disclosed embodiments.

Privacy system 710 may also be communicatively connected to one or more memory devices (e.g., databases) locally or through the network 730. The remote memory devices may be configured to store information and may be accessed and/or managed by privacy system 710. By way of example, the remote memory devices may be document management systems, Microsoft™ SQL database, Mongo databases, SharePoint™ databases, Oracle™ databases, Sybase™ databases, or other relational or non-relational databases. The remote memory devices may also include software, such as Hadoop™, enabling them to store and process large volumes of data distributed across a cluster of commodity servers and commodity storage connected via the network 730. These memory devices may consist of files on the system 700 that are simply read into the memory, and the disclosed embodiments are not limited to separate databases or even to the use of a database. Systems and methods consistent with disclosed embodiments, however, are not limited to separate databases or even to the use of a database.

Privacy system 710 may also include one or more I/O devices 820 that may comprise one or more interfaces for receiving signals or input from devices and providing signals or output to one or more devices that allow data to be received and/or transmitted by privacy system 710. For example, privacy system 710 may include interface components, which may provide interfaces to one or more input devices, such as one or more keyboards, mouse devices, touch screens, track pads, trackballs, scroll wheels, digital cameras, microphones, sensors, scanners, and the like, that enable privacy system 710 to receive data from one or more users.

In exemplary embodiments of the disclosed technology, privacy system 710 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While privacy system 710 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of privacy system 710 may include a greater or lesser number of components than those illustrated.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high-level and/or low-level software instructions, such as machine code (e.g., such as that produced by a compiler) and/or high-level code that can be executed by a processor using an interpreter.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

EXEMPLARY USE CASES

The following exemplary use cases describe examples of a typical user flow pattern. They are intended solely for explanatory purposes and not in limitation. In one example, a host on a host computing device may save his or her privacy settings with the privacy system before entering into a videoconference with at least one attendee computing device. The host may intend to share a document or program running on the host computing device and present in a graphical user interface displayed on the host computing device. The system may monitor the graphical user interface for a presence of one or more articles of sensitive information that should not be revealed to the one or more attendee computing devices. The host may speak a word or sequence of words that is received by the privacy system and interpreted using natural language processing and semantic meaning extraction. If the system determines that the spoken word or sequence of word exceeds a similarity threshold to a predetermined audio queue, the privacy system may determine that the host imminently intends to transition from a video mode of the video conference to a screen share mode where the graphical user interface present on the host computing device will be transmitted to and shared with the attendee computing device. In response, the system may identify an article of sensitive information present in the graphical user interface and conceal the article of sensitive information. The system may provide data to the host computing device to generate an updated graphical user interface in which the article of sensitive information is concealed. Finally, the host computing device may share the updated graphical user interface with the one or more attendee computing devices in a shared screen session with the article of sensitive information concealed. In some embodiments, rather than concealing the article of sensitive information in an updated graphical user interface, the system may cause the host computing device to transition to video mode in place of the screen share mode when an article of sensitive information is detected in the graphical user interface.

In another example, the host computing device may receive a pop-up message during a screen share session of a video conference. If the user security preferences of the host dictate a preference for security, the system may detect the pop-up, and conceal the pop-up with a bounding box in substantially real time, regardless of whether the pop-up message actually contains article of sensitive information. Accordingly, the attendees will not be able to view any pop-up messages which may inadvertently appear on the graphical user interface of the host computing device during the video conference.

Examples of the present disclosure relate to systems and methods for dynamically concealing sensitive information in a shared screen session of a video conference. In one aspect, a system for dynamically concealing sensitive information in a shared screen session of a video conference is disclosed. The system may implement a method according to the disclosed embodiments. The system may include one or more processors, and a memory in communication with the one or more processors and storing instructions, that when executed by the one or more processors are configured to cause the system to perform steps of a method according to the disclosed embodiments. For example, the system may establish communication with a first computing device associated with a host. The first computing device may be in communication with one or more second computing devices that may each be associated with a participant in a video conference. Each computing device in the video conference may be switched between a screen share mode and a video mode. The system may determine that one or more articles of sensitive information are visible in a first graphical user interface associated with the first computing device. The system may receive a first signal from the first computing device. The first signal may be indicative of a first intent of the host to switch to the screen share mode. The screen share mode may include sharing the first graphical user interface with the one or more second computing devices during the video conference. In response to the first signal, the system may execute one or more privacy actions.

In some embodiments, the first signal further includes an audio queue based on one or more utterances of the host. The system may further receive data indicative of the audio queue from the first computing device and detect one or more keywords indicative of the intent.

In some embodiments, the one or more privacy actions are determined based in part on user security preferences.

In some embodiments, the one or more privacy actions may include an action selected from (i) concealing the sensitive information in the first graphical user interface to generate a second graphical user interface provided for display on the one or more second computing devices and (ii) providing for display to the one or more second computing devices the video mode to replace the first graphical user interface.

In some embodiments, concealing the sensitive information may include detecting a pop-up containing one or more articles of sensitive information in the first graphical user interface, generating a bounding box surrounding the detected pop-up, and concealing the detected pop-up with the bounding box to generate the second graphical user interface.

In some embodiments, determining that the one or more articles of sensitive information are visible in the first graphical user interface further includes receiving data indicative of one or more applications running on the first computing device, determining whether the one or more applications include one or more templates having at least one template field that correlates to one of a plurality of predetermined template fields indicative of an article of sensitive information, verifying the at least one template field to determine that the at least one template field contains the article of sensitive information, and generating the second graphical user interface based on concealing the at least one template field.

In some embodiments, the system may update a trained machine learning model configured to identify the one or more templates based on determining that the at least one template field contains the article of sensitive information, determine a sensitivity measurement for each identified article of sensitive information, and update the trained machine learning model based on user feedback indicating an accuracy of the sensitivity measurement for each identified article of sensitive information.

In some embodiments, identifying one or more articles of sensitive information may further include identifying at least a first article of sensitive information that is concealed in the first graphical user interface to generate the second graphical user interface, and the system may be further configured to receive a second signal from the first computing device indicating a second intent of the host to reveal the first article of sensitive information in the second graphical user interface being provided for display on the one or more second computing devices. The system may generate, for display on the one or more second computing devices, a third graphical user interface that reveals the first article of sensitive information while keeping a remainder of the one or more articles of sensitive information concealed. The system may monitor the third graphical user interface for at least a second article of sensitive information and, in response to detecting the second article of sensitive information in the third graphical user interface, the system may disable the shared screen session of the third graphical user interface with the one or more second computing devices. The system may generate a fourth graphical user interface based on concealing the second article of sensitive information in the third graphical user interface and provide the fourth graphical user interface for display on the one or more second computing devices.

In another aspect, a system for dynamically concealing sensitive information in a shared screen session of a video conference is disclosed. The system may implement a method according to the disclosed embodiments. The system may include one or more processors, and a memory in communication with the one or more processors and storing instructions, that when executed by the one or more processors are configured to cause the system to perform steps of a method according to the disclosed embodiments. For example, the system may receive, from a first computing device in a video conference with at least a second computing device, a first signal for the first computing device to screen share a first graphical user interface with at least the second computer device over the video conference, wherein each computing device in the video conference may switch between a screen share mode and a video mode. The system may monitor the first graphical user interface for the one or more articles of sensitive information. In response to detecting a first article of sensitive information of one or more articles of sensitive information in the first graphical user interface, the system may disable the screen share including the first graphical user interface with at least the second computing device over the video conference and enable the video mode.

In some embodiments, the first signal further includes an audio queue based on one or more utterances of a host associated with the first computing device.

In some embodiments, the system may receive data indicative of the audio queue from the first computing device and detect one or more keywords indicative of an intent to screen share the first graphical user interface.

In some embodiments, the first signal further includes data generated in response to the first computing device receiving an input from a host. In some embodiments, enabling the video mode happens in substantially real-time in response to the screen share mode being disabled.

In some embodiments, the one or more articles of sensitive information further include a social security number, a credit card number, a bank account number, a password, a private message, or combinations thereof.

In some embodiments, the system may receive, from the first computing device, a second signal from the first computing device to display the first article of sensitive information in the screen share mode and provide for display the first graphical user interface to be screen shared with the second computing device.

In another aspect, a computer implemented method for dynamically concealing sensitive information in a shared screen session of a video conference is disclosed. The method may include receiving, from a presenting computing device associated with a presenter, a first signal indicating an intent of the presenter to display a first graphical user interface associated with the presenting computing device as a first shared screen of the shared screen session with at least one attendee computing device. The method may include monitoring the first graphical user interface for one or more articles of sensitive information. The method may include detecting a first presence of at least a first article of the one or more articles of sensitive information in the first graphical user interface. The method may include concealing the detected at least first article of sensitive information in the first presence within the first graphical user interface to form a modified graphical user interface. The method may include providing for display the modified graphical user interface to the at least one attendee computing device.

In some embodiments, the first signal may further include an audio queue based on one or more utterances of the presenter. In some embodiments, the method may include receiving data indicative of an audio queue from the presenting computing device and detecting one or more keywords indicative of the intent.

In some embodiments, the first signal further includes data generated in response to the presenting computing device receiving an input from the presenter In some embodiments, the one or more articles of sensitive information may further include a social security number, a credit card number, a bank account number, a password, a private message, or combinations thereof.

What is claimed is:

1. A system comprising:
   one or more processors;
   a memory in communication with the one or more processors and storing instructions that, when executed by the one or more processors, are configured to cause the system to:
   establish communication with one or more computing devices participating in a video conference, wherein each of the one or more computing devices may switch between a screen share mode and a video mode of the video conference;
   monitor a first graphical user interface associated with a first computing device of the one or more computing devices for one or more articles of sensitive information;
   determine that the one or more articles of sensitive information are visible in the first graphical user interface based on identifying one or more templates having at least one template field containing one or more articles of sensitive information, the first computing device associated with a host;
   receive a first signal from the first computing device indicating a first intent of the host to switch to the screen share mode, wherein the screen share mode comprises sharing the first graphical user interface with the one or more computing devices during the video conference; and
   responsive to receiving the first signal, execute one or more privacy actions comprising causing the one or more computing devices to display the video mode in place of the first graphical user interface.

2. The system of claim 1, wherein the first signal further comprises an audio queue based on one or more utterances of the host and comprising instructions, when executed by the one or more processors are further configured to cause the system to:
   receive data indicative of the audio queue from the first computing device; and
   detect one or more keywords indicative of the first intent.

3. The system of claim 1, wherein the one or more privacy actions are determined based in part on user security preferences.

4. The system of claim 1, wherein determining that the one or more articles of sensitive information are visible in the first graphical user interface further comprises:
- receiving data indicative of one or more applications running on the first computing device;
- determining whether the one or more applications comprise one or more templates having at least one template field that correlates to one of a plurality of predetermined template fields indicative of an article of sensitive information;
- verifying that the at least one template field to determine that the at least one template field contains the article of sensitive information; and
- generating a second graphical user interface based on concealing the at least one template field.

5. The system of claim 1, wherein identifying one or more templates having at least one template field containing one or more articles of sensitive information further comprises utilizing a trained machine learning model to identify the one or more templates.

6. The system of claim 1, wherein identifying one or more articles of sensitive information further comprises identifying at least a first article of sensitive information that is concealed in the first graphical user interface to generate a second graphical user interface, and wherein the instructions, when executed by the one or more processors, are further configured to cause the system to:
- receive a second signal from the first computing device, the second signal indicating a second intent of the host to reveal the first article of sensitive information in the second graphical user interface being provided for display on the one or more computing devices;
- generate, for display on the one or more computing devices, a third graphical user interface that reveals the first article of sensitive information while keeping a remainder of the one or more articles of sensitive information concealed;
- monitor the third graphical user interface for at least a second article of sensitive information;
- responsive to detecting the second article of sensitive information in the third graphical user interface, disable the screen share mode of the third graphical user interface with the one or more computing devices;
- generate a fourth graphical user interface based on concealing the second article of sensitive information in the third graphical user interface; and
- provide the fourth graphical user interface for display on the one or more computing devices.

7. The system of claim 1, wherein the at least one template field containing one or more articles of sensitive information comprises a directory hierarchy associated with an application running on the first computing device.

8. A system comprising:
- one or more processors;
- a memory in communication with the one or more processors and storing instructions that, when executed by the one or more processors, are configured to cause the system to:
  - receive, from a first computing device in a video conference with at least a second computing device, a first signal for the first computing device to screen share a first graphical user interface with at least the second computer device over the video conference, wherein each computing device in the video conference may switch between a screen share mode and a video mode;
  - monitor the first graphical user interface for one or more articles of sensitive information, wherein the monitoring further comprises identifying one or more templates having at least one template field containing the one or more articles of sensitive information; and
  - responsive to detecting a first article of sensitive information of one or more articles of sensitive information in the first graphical user interface:
    - disable the screen share mode comprising the first graphical user interface with at least the second computing device over the video conference; and
    - cause at least the second computing device to display the video mode in place of the first graphical user interface.

9. The system of claim 8, wherein the first signal further comprises an audio queue based on one or more utterances of a host associated with the first computing device.

10. The system of claim 9, further comprising additional instructions that, when executed by the one or more processors, are configured to cause the system to:
- receive data indicative of the audio queue from the first computing device; and
- detect one or more keywords indicative of an intent to screen share the first graphical user interface.

11. The system of claim 8, wherein the first signal further comprises data generated in response to the first computing device receiving an input from a host.

12. The system of claim 8, wherein enabling the video mode happens in substantially real-time in response to the screen share mode being disabled.

13. The system of claim 8, wherein the one or more articles of sensitive information further comprise a social security number, a credit card number, a bank account number, a password, a private message, or combinations thereof.

14. The system of claim 8, further comprising additional instructions that, when executed by the one or more processors, are configured to cause the system to:
- receive, from the first computing device, a second signal from the first computing device to display the first article of sensitive information in the screen share mode; and
- provide for display the first graphical user interface to be screen shared with the second computing device.

15. The system of claim 8, wherein the at least one template field containing the one or more articles of sensitive information comprises a directory hierarchy associated with an application running on the first computing device.

16. A computer-implemented method comprising:
- receiving, from a presenting computing device associated with a presenter, a first signal indicating an intent of the presenter to display a first graphical user interface associated with the presenting computing device as a first shared screen of a shared screen session with at least one attendee computing device, wherein the presenting computing device can switch between the shared screen session and a video mode that displays a video feed associated with the presenting computing device to the at least one attendee computing device;
- monitoring the first graphical user interface for one or more articles of sensitive information by identifying one or more templates having at least one template field containing the one or more articles of sensitive information;

detecting at least a first article of the one or more articles of sensitive information in the first graphical user interface; and causing the at least one attendee computing device to display the video feed associated with the presenting computing device in place of the first graphical user interface.

17. The method of claim 16, wherein the first signal further comprises an audio queue based on one or more utterances of the presenter.

18. The method of claim 17, further comprising:
receiving data indicative of the audio queue from the presenting computing device; and
detecting one or more keywords indicative of the intent.

19. The method of claim 16, wherein the first signal further comprises data generated in response to the presenting computing device receiving an input from the presenter.

20. The method of claim 16, wherein the one or more articles of sensitive information further comprise a social security number, a credit card number, a bank account number, a password, a private message, or combinations thereof.

* * * * *